United States Patent [19]
Kikuchi

[11] Patent Number: 6,082,677
[45] Date of Patent: Jul. 4, 2000

[54] SATELLITE ORBITING TOWARD WEST IN THE EQUATORIAL PLANE AND METEOROLOGICAL SATELLITE SYSTEM USING THE SATELLITE

[75] Inventor: Akira Kikuchi, Tokyo, Japan

[73] Assignee: National Space Development Agency of Japan, Tokyo, Japan

[21] Appl. No.: 09/190,026

[22] Filed: Nov. 12, 1998

[30] Foreign Application Priority Data

Nov. 14, 1997 [JP] Japan ................................. 9-329647

[51] Int. Cl.$^7$ ................................. B64G 1/00; H04B 7/185
[52] U.S. Cl. ................. 244/158 R; 244/173; 342/352; 455/12.1
[58] Field of Search .................... 244/158 R, 173, 244/166; 324/352; 455/427, 12.1

[56] References Cited

U.S. PATENT DOCUMENTS

| | | | |
|---|---|---|---|
| 3,747,095 | 7/1973 | Wilson | 342/356 |
| 4,292,683 | 9/1981 | Jueneman | 370/324 |
| 4,445,118 | 4/1984 | Taylor et al. | 342/357.09 |
| 4,679,753 | 7/1987 | Landecker | 244/171 |
| 4,688,092 | 8/1987 | Kamel et al. | 348/147 |
| 5,259,577 | 11/1993 | Achkar et al. | 244/164 |
| 5,262,953 | 11/1993 | De Waard et al. | 701/226 |
| 5,279,483 | 1/1994 | Blancke et al. | 244/165 |
| 5,326,054 | 7/1994 | Turner | 244/158 R |
| 5,433,726 | 7/1995 | Horstein et al. | 244/158 R |
| 5,439,190 | 8/1995 | Horstein et al. | 244/158 R |
| 5,551,624 | 9/1996 | Horstein et al. | 244/158 R |
| 5,652,597 | 7/1997 | Caille | 343/756 |
| 5,678,175 | 2/2000 | Stuart et al. | 455/13.1 |
| 5,890,679 | 4/1999 | Chetnik | 244/158 R |
| 5,906,337 | 5/1999 | Williams et al. | 244/158 R |
| 5,927,652 | 7/1999 | Lansard | 244/158 R |
| 5,957,411 | 9/1999 | Liu et al. | 244/169 |
| 6,002,916 | 12/1999 | Lynch | 455/13.1 |
| 6,017,003 | 1/2000 | Mullins | 244/173 |
| 6,023,291 | 2/2000 | Kamel et al. | 455/12.1 |

*Primary Examiner*—Michael J. Carone
*Assistant Examiner*—Fredrick T. French, III
*Attorney, Agent, or Firm*—Armstrong, Westerman, Hattori, McLeland & Naughton

[57] ABSTRACT

Achieved herein is a satellite capable of readily obtaining in a short time span a continuous image of the whole earth by a single unit of the satellite alone, the westward equatorial satellite being an artificial satellite having thereon an image pickup means for picking up an image of the earth and having a circular orbit toward west at an altitude of about 13,942 km above the equator of the earth. Also provided is a meteorological satellite system capable of avoiding non-continuousness between geostationary meteorological satellites, of readily performing reciprocity data calibration between the geostationary meteorological satellites and of adding a standby function to such geostationary meteorological satellites, by combining a westward equatorial satellite having a circular orbit toward west at an altitude of about 13,942 km above the equator of the earth into a meteorological satellite system employing five units of geostationary meteorological satellites.

4 Claims, 5 Drawing Sheets

SATELLITE ORBITING TOWARD WEST IN THE EQUATORIAL PLANE AND METEOROLOGICAL SATELLITE SYSTEM USING THE SATELLITE

BACKGROUND OF THE INVENTION

The present invention relates to artificial satellites for acquiring an image of the earth such as for meteorological observation, and more particularly relates to an artificial satellite and a meteorological satellite system using the satellite, which can be used to provide a meteorological satellite system having a plurality of geostationary meteorological satellites with a useful complementary function.

Currently, the meteorological satellite system of the world is consisting of five geostationary meteorological satellites and two polar orbit meteorological satellites. In particular, as shown in FIG. 1, the meteorological satellite system is essentially constituted by: a geostationary meteorological satellite, GMS, which is called as "HIMAWARI" of Japan; two geostationary meteorological satellites, GOES-EAST, GOES-WEST, of the U.S.; a geostationary meteorological satellite, METEOSAT, of the European Space Agency; a geostationary meteorological satellite, GOMS, of Russia; and polar orbit meteorological satellites, NOAA and METOP, of the U.S. and the European Space Agency.

The geostationary meteorological satellites refer to those in a geostationary orbit 101, at an altitude of about 35,786 km and a nearly zero inclination angle, and are deployed as one at each of five nearly equidistant positions along the equator. All areas of the earth but polar regions are continuously observable by these geostationary meteorological satellites, images being acquired once in every approximately 30 minutes. In particular, in the case of "HIMAWARI" for example, a spin-scan visible/infrared radiometer is employed as the main observation instrument. The rotation of the satellite on its own axis is used to scan the earth's surface from west to east and displacement of scanning spot along the north and south direction is performed by a motor-driven scan mirror to obtain an image. Specifically due to the fact that a geostationary meteorological satellite is in the geostationary earth orbit, there are such advantages as that a target area can be observed at irregular intervals and that the antenna of an earth station for receiving data from the satellite is required to continuously point to only the same direction.

Further, the polar orbit meteorological satellites are in sun synchronous orbits having altitudes of 833 to 870 km and inclination angles of 98.86 to 98.70 degrees, being deployed as one in each of the two orbits having their orbital planes perpendicular to each other. Frequent observations of the polar regions of the earth can be made by means of these satellites. Especially, since they are in sun synchronous orbits, there is an advantage that images can be obtained of the same solar irradiative conditions, i.e., at the same local time.

Of the existing meteorological satellite system having the above described arrangement, the geostationary meteorological satellites have actually performed for 25 years and the polar orbit satellites for 35 years.

There are problems as will be described below, however, in the currently used meteorological satellite system of the world. First, it is difficult to have standby satellites as a reserve in case of a failure of the five geostationary meteorological satellites. Since a satellite's failure occurs suddenly and unexpectedly, an ordinary approach to be taken as a precaution against such failure is the launching of a standby satellite having the same function for a satellite of which performance should not be interrupted. The problem here is that it is generally difficult to bear the costs for such approach. Although communication satellites are also among the geostationary satellites, their standby satellites are used in applications where an intermission is allowable. In the case of meteorological satellites, however, their standby satellites are of no actual use when the currently used satellites are sound. This is an additional factor for hesitation as to whether or not to have a standby satellite. As a result, only one of the five deployed positions has, without an interruption, been able to provide images of the earth during the 25-year performance period up to the present time. It, too, has not necessarily been free from unstable conditions.

Secondly, there is a problem of noncontinuousness in observation mode among the five geostationary meteorological satellites. In particular, meteorological phenomena in the middle-latitude regions on the earth tend to move from west to east. For this reason, to predict weather conditions of a certain region for a range of several days, it is necessary to grasp the meteorological phenomena of its westward regions. With the observation from a single geostationary meteorological satellite, however, there is a problem that such westward regions are placed outside its observation range. Theoretically in the spirit of this meteorological satellite system, it suffices to use data from a geostationary meteorological satellite which is located west at the next deployment position. However, only two of the five geostationary meteorological satellites use the same earth scan system for acquisition of images. The satellites are of different specifications from each other mainly because the providers of the respective satellites are different. This results in a problem that data received from an adjoining satellite cannot be easily processed. Furthermore, for example due to noncontinuousness of image acquisition time, it has been very difficult to synthesize an image by combining those of different geostationary meteorological satellites when planning an observation of the whole earth.

Thirdly, there is a problem that calibration of data is difficult. While the brightness of images exclusively used in meteorological satellites is determined based on radiant intensity of heat/infrared rays, it is important in meteorological observations to grasp such radiant intensity to an adequate accuracy. In general, however, due to limitation in the weight of an artificial satellite, performance of an accurate data calibration within the satellite alone is not free from difficulties. While this is the reason for trying reciprocity calibrations between the satellites, actual attempts have not been made very often because of the fact that separate data observing the same position at the same time are not readily obtainable between the geostationary meteorological satellites.

SUMMARY OF THE INVENTION

To eliminate the above described problems in the conventional geostationary meteorological satellite or meteorological satellite system, it is a main object of the present invention to provide a satellite orbiting toward west in the equatorial plane which, even as a single satellite, is capable of readily obtaining in a short time span a continuous image of the whole earth such as for meteorological observation.

In accordance with the present invention, there is provided an artificial satellite having image pickup means mounted thereon for picking up an image of the earth, the satellite 1 is caused to revolve toward west in a circular orbit 3 having an altitude of 13,942 km above the equator of the earth 2 as shown in FIG. 2, constituting a westward equatorial satellite.

In the westward equatorial satellite constructed as the above, when the earth is scanned by the image pickup means along a meridian including a spot directly below the satellite, a continuous image of the earth of the configuration as shown in FIG. 3 is obtained based on two-dimensional scan resulting from such scanning in the north and south direction and the westward movement of the satellite. Here, in the case of this circular orbit toward west having the altitude of 13,942 km, since the satellite revolves westward three times a day and the earth rotates eastward once during this time span, the spot directly below the satellite is swept four times a day and an image as shown in FIG. 3 is obtained in six hours. Therefore, by employing two westward equatorial satellites so that they come to opposite positions over the earth, such an image can be obtained once in every three hours. The above main object is thereby achieved.

It is another object of the present invention to provide a meteorological satellite system in which: a spare function is provided for the conventional meteorological satellite system; noncontinuousness among the plurality of geostationary meteorological satellites is avoided; and, in addition, reciprocity calibration can be performed of data between the geostationary meteorological satellites.

In accordance with the present invention, a westward equatorial satellite orbiting toward west in a circular orbit at an altitude of about 13,942 km above the equator of the earth is combined into a meteorological satellite system employing a plurality of geostationary meteorological satellites so as to complement the meteorological observation by the geostationary meteorological satellites.

When the above described westward equatorial satellite is employed as combined into a meteorological satellite system consisting of five geostationary meteorological satellites, it is obviously able to act as a spare commonly for the five geostationary meteorological satellites, since a continuous image of the earth as shown in FIG. 3 is obtained in every 6 hours by the westward equatorial satellite or in every 3 hours if two units are employed. Although the altitude of the westward equatorial satellite is relatively low or about 40% of the altitude of a geostationary meteorological satellite, it is yet a height suitable for observing the whole earth surface as is obvious from the image of the earth in FIG. 3. Also, no problem is caused by the fact that the observation by the westward equatorial satellite is performed less frequently than that by a geostationary meteorological satellite, since an interpolated image for a point in time is generated at a receiving station based on the regularity of observation time.

Furthermore, since the image obtained by such westward equatorial satellite has no interruption in longitudes as shown in FIG. 3, it obviously solves the problem of noncontinuousness between the geostationary meteorological satellites.

Furthermore, since it is easy to perform reciprocity data calibration between a geostationary meteorological satellite and the westward equatorial satellite, an indirect reciprocity data calibration can be readily performed between the geostationary meteorological satellites with an intermediary of the westward equatorial satellite. Moreover, when the same region is observed at the same time by a geostationary meteorological satellite and the westward equatorial satellite, data are obtained of the same hour generally with respect to a line on the earth's surface. In general, since points of various radiant Levels exist on the line, reciprocity data calibration can be performed generally with respect to the range of these levels. The above described another object is thereby achieved.

DESCRIPTION OF THE PREFERRED EMBODIMENTS

Figure 4:
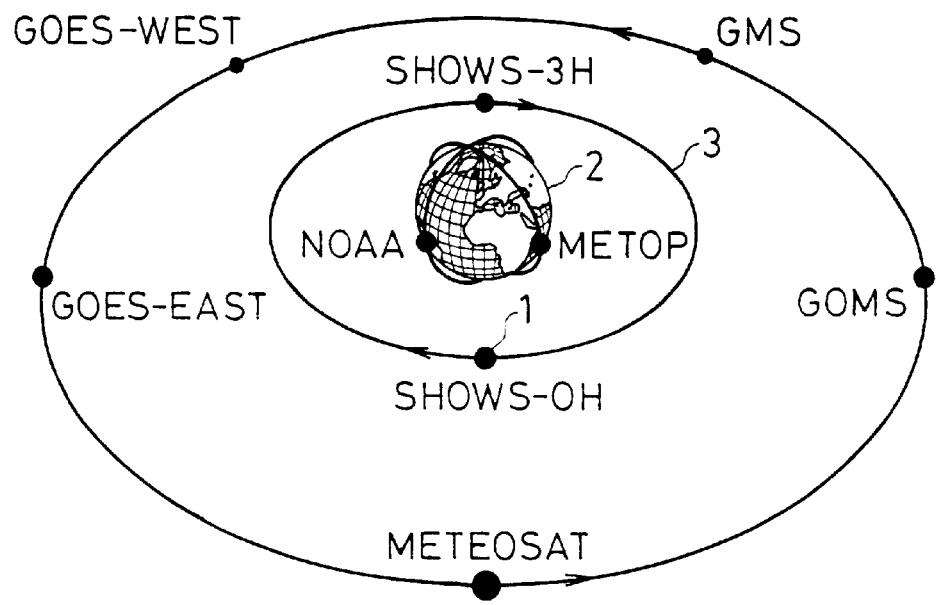
FIG. 4 shows a manner of the meteorological satellite system constructed by combining the westward equatorial satellites according to the present invention into a meteorological satellite system consisting of five geostationary meteorological satellites and additional polar orbit meteorological satellites.

An embodiment of the present invention will now be described. FIG. 4 shows the construction of a new meteorological satellite system constituted by combining westward equatorial satellites according to the present invention into the existing meteorological satellite system which is consisting of five geostationary meteorological satellites and two polar orbit meteorological satellites. Referring to FIG. 4, SHOWS-0H and SHOWS-3H each represents a westward equatorial satellite in an orbit having an altitude of 13,942 km and inclination angle of 180 degrees. It should be noted that having the inclination angle of 180 degrees is synonymous with orbiting toward west above the equator. Although one unit alone of the westward equatorial satellite is useful, it is more effective when employed in two units as shown in FIG. 4. Therefore the present embodiment is illustrated as that using two units. Since the westward equatorial satellite has an orbit toward west and passes above the same spot on the earth in every six hours, it is expressed in English words as Six-Hour-Orbit-toward-West Satellite and abbreviated as SHOWS. One which passes above Greenwich at "Hour 0" is referred to as SHOWS-0H and the other at "Hour 3" is referred to as SHOWS-3H as shown in FIG. 4.

A description will be given in more detail below with respect to the reason for selecting the equatorial orbit toward west at an altitude of 13,942 km as the orbit of the satellite in the present invention. When the equatorial orbit toward west at the altitude of 13,942 km is employed, the satellite revolves toward west three times a day as has been described above. Since the earth rotates toward east once in this interval, the spot directly below the satellite sweeps the earth's surface four times. In short, it appears to revolve at a period of 6 hours to a person on the earth's surface. The fact that it completes a circle or 360 degrees in six hours is well compatible with our methods of expressing angle, time and distance. In particular, the longitude of the spot directly below the satellite changes at a rate of 1 degree per minute and the spot directly below the satellite is moved 1 nautical mile per second. The fact of being divisible without a remainder by these significant quantities results in a high degree of efficiency in operation which is a great advantage.

The period of revolution of a satellite about the earth is proportional to the 3/2 power of the radius of the satellite's orbit. Instead of expressing such period in terms of time and angle, it will be described below by using an expression of sweeping the earth's surface in a period of an integral number of hours and with an integral number of times per day. In particular, it is possible to cause the satellite to apparently revolve 6 times about the earth by lowering the altitude of the satellite from 13,942 km. In this case however the range of latitudes to be picked up is narrowed by 8 degrees from both north and south compared to the latitudinal range shown in FIG. 3. Especially when considering the fact that an interest in use of the data is higher in the middle- and high-latitude regions, this orbiting path is less attractive. It should be noted that, while observation is made 1.5 times more frequently in this orbiting path, the problem of lower frequency of observation can be eliminated by a timewise interpolation of data as has been described above. In this respect, too, attractiveness is less in the orbiting path having a lower altitude.

On the other hand, it is also possible to cause a satellite to apparently revolve three times about the earth by increasing the altitude of the satellite. In this case, the altitude of the satellite is increased and strength of the earth's magnetic field at the position of the satellite is smaller or 0.44 times so that a magnetic torquer does not work effectively. Accordingly, even when explained in the above expressing method instead of an expression in time and angle, the equatorial orbiting path at an altitude of 13,942 km is well balanced and can be said as the orbit having the most excellent altitude.

A satellite orbiting toward east in the equatorial plane will now be considered. If it is caused to revolve toward east at an altitude of 13,942 km, the earth surface is to be swept in 12 hours. The period of such sweeping time is too long. In general, since most of the rocket launching sites are so located that satellites revolving toward east can easily be launched, it is possible to shorten the interval of observation by launching a large number of satellites using the merit of easier launching of satellites. As can be seen from FIG. 4, however, more than one unit of antenna and receiver are necessary at each user's earth station if three or more satellites have been launched. This is not permissible, since it is expected to serve as many users as possible. Therefore, one revolving toward west is much more useful.

For the above reasons, the equatorial orbit toward west having an altitude of 13,942 km is selected in the present invention. When this equatorial orbit toward west is employed, the following advantages are also obtained:

(1) Since the distance from the earth is relatively small or 40% of the case of a geostationary meteorological satellite, the sensitivity design of the radiometer for picking up an image is relatively easy. In other words, radiant intensity resolution can be improved.

(2) Also due to the smaller distance, designing of scan mechanism of the radiometer for picking up an image is relatively easy. In other words, spatial resolution can be improved.

(3) Also due to the smaller distance, communication with an earth station is easier. In other words, a smaller antenna suffices.

(4) The longest time duration of eclipse is shortened to about 70% of the case of a geostationary meteorological satellite. Accordingly, discharge depth of the battery is mitigated.

(5) The tidal force due to the sun and moon is proportional to the radius of the orbit of the satellite. Since the orbital radius of the satellite according to the present invention is about one half that of the geostationary orbit, the fuel for maintaining the inclination angle of the orbit which is required in proportion to the tidal force becomes about one half that in the case of a geostationary meteorological satellite.

(6) The angular velocity for revolving about the earth of the satellite moving toward west in the equatorial orbit according to the present invention is three times that of a geostationary satellite. The angular momentum of the orbit, proportional to the product of such angular velocity and the second power of the orbital radius, therefore, amounts to ¾ of a geostationary satellite. On the other hand, the torque for changing such angular momentum is ¼ of the geostationary satellite, since it is proportional to the product of the orbital radius and the tidal force. Accordingly, the drift rate of the inclination angle when trajectory maintenance control is not performed is relatively small or ⅓ of the geostationary meteorological satellite, since it is proportional to the ratio of the torque to the angular momentum.

A description will now be given with respect to the method for launching a satellite into an orbit toward west in the equatorial plane at an altitude of 13,942 km according to the present invention. Launching means for an injection into such orbit has conventionally been limited. In addition, there are such disadvantages as that the orbit crosses the Van Allen belt where charged particles exist in a large quantity. These however can be overcome by the existing technologies, though reasonable penalties must be paid.

Figure 5:
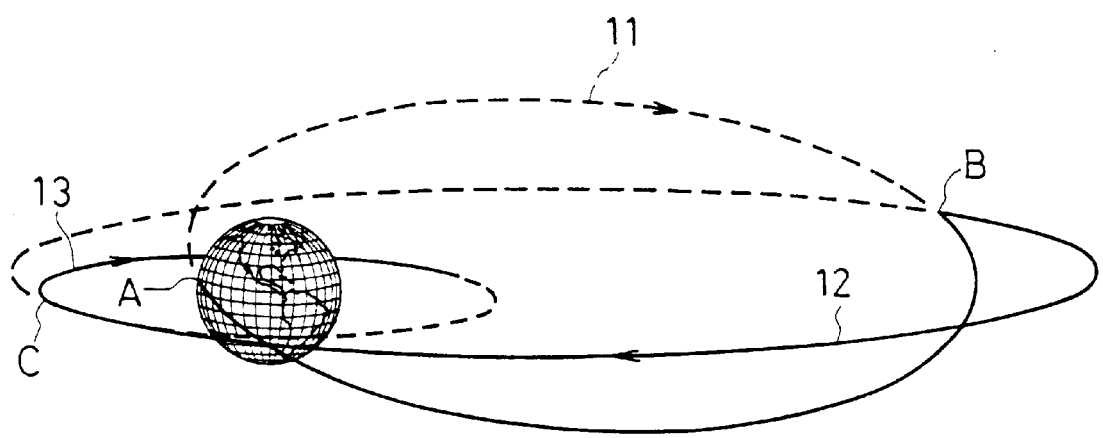
FIG. 5 illustrates the procedure for injecting the westward equatorial satellite according to the present invention into the predetermined orbit.

In particular, for the injection into the orbit, launching is possible from Tanegashima Space Center of Japan by using H-II rocket. Its sequence is shown in FIG. 5. Referring to FIG. 5, point A is the position at which a satellite is separated from the rocket in an ordinary launching of geostationary satellite by H-II rocket. Its altitude is about 200 km and, in the case of a geostationary satellite, the satellite is separated thereat after being accelerated to such velocity that its apogee be at an altitude of about 36,000 km. In the case of the westward equatorial satellite, on the other hand, such separation is to be made after a further acceleration so that altitude of apogee be about 100,000 km. As a result, the westward equatorial satellite and the satellite's propulsion stage attached thereto are injected into an elongated elliptical orbit 11 having an inclination angle of about 30 degrees and, after a while, reach point B at an altitude of 100,000 km.

The reason for increasing the altitude of apogee to such an extent is to reduce the velocity at the apogee so as to save the amount of energy necessary in acceleration for directional change of the velocity. By such acceleration at point B, the inclination angle of the orbit is changed from the original 30 degrees to the desired 180 degrees and at the same time the altitude of perigee is increased from the original 200 km to the final orbital altitude of 13,942 km. As a result, the satellite is directed from point B toward point C by way of an intermediate orbit 12 which is indicated by a solid line. Upon arrival at point C, it is decelerated to enter a final orbit 13 by lowering apogee from 100,000 km to 13,942 km. After the injection into the final orbit, the propulsion stage is separated from the satellite and the satellite is left alone.

In the case of launching the westward equatorial satellite according to the present invention in the manner as described above by using H-II rocket, while the launching capability of H-II rocket is 4 tons for the geostationary transfer orbit, a load of about 2.7 tons can be launched to the altitude of 100,000 km. As the required weight of the propulsion stage is estimated to be 2 tons, a satellite of about 700 kg can be injected into the final orbit. This is a value of well-balanced extent and neither too much nor too little to carry out the mission.

Figure 6:
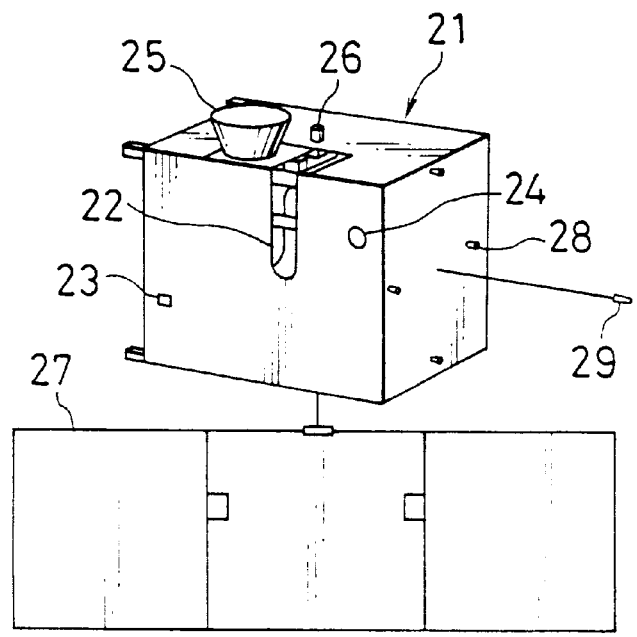
FIG. 6 shows a manner of operation in a concrete example of the westward equatorial satellite according to the present invention.

A description will now be given with respect to a concrete example of the westward equatorial satellite according to the present invention. FIG. 6 shows a manner of the satellite in operation. Referring to FIG. 6, a satellite body in a hexahedral form is denoted by numeral 21 and those placed on the surface facing the earth are: a radiometer observation aperture, 22; an earth sensor, 23; and S-band antenna, 24. Those placed on the north side surface are: radiator, 25; and polestar tracker, 26. Extended from the opposite south side surface is a solar panel 27. It should be noted that, in FIG. 6, numeral 28 denotes a thruster for controlling attitude in orbit and 29 denotes a USB antenna. Generally in a meteorological satellite, since the radiator for cooling the detector of a radiometer must be attached to a side where it is continuously not exposed to the sun, i.e., the north or south side., a solar panel cannot be attached to such surface. In the case of such one-sided wing where the solar panel 27 is mounted only on the south side surface, a torque due to solar wind occurs. The method for offsetting this in the case of a geostationary meteorological satellite is generally a provision of a solar sail on the side where the radiator is disposed.

Here, since the earth's magnetic field is inversely proportional to the third power of radius, the magnetic field in the case of the westward equatorial satellite according to the present invention, due to its lower orbit, is much more intense than or eight times that in the case of a geostationary meteorological satellite. It is therefore possible to cancel the torque due to solar wind by disposing a magnetic torquer which uses an electromagnet. For this reason, there is no need to provide a solar sail on the north side surface. As a result that something obstructing the view has been removed, the polestar can be used as a reference for attitude control. Due to the fact that direction of the polestar can be found and also based on ascertainment of the north, south, east and west edges of the earth and the directions of fixed stars by means of the radiometer and use of a built-in clock, this westward equatorial satellite is able to grasp its own orbit and attitude.

It is necessary to superimpose the lines of latitudes and longitudes and coastal lines on the images from a meteorological satellite. With the currently used meteorological satellites, such task is performed at a control center on the earth while computing the orbit and attitude of the satellite, and the users are furnished with the results. By contrast, the westward equatorial satellite transmits to a user's earth station the self-ascertained orbit and attitude data together with raw image data so that the user can superimpose the lines of latitude and longitude and the coastal lines.

Figure 1:
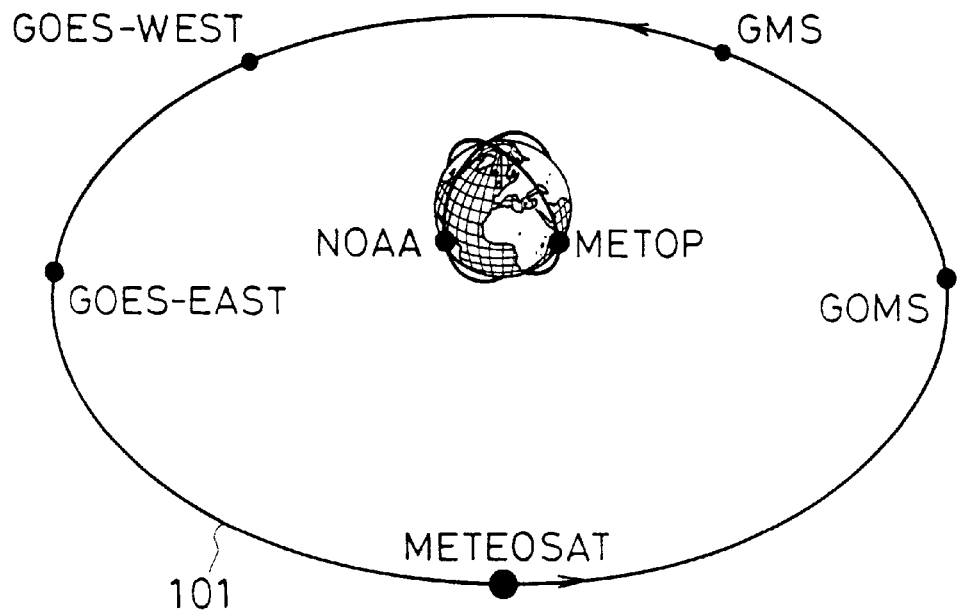
FIG. 1 shows the construction of the existing meteorological satellite system of the world.
Figure 2:
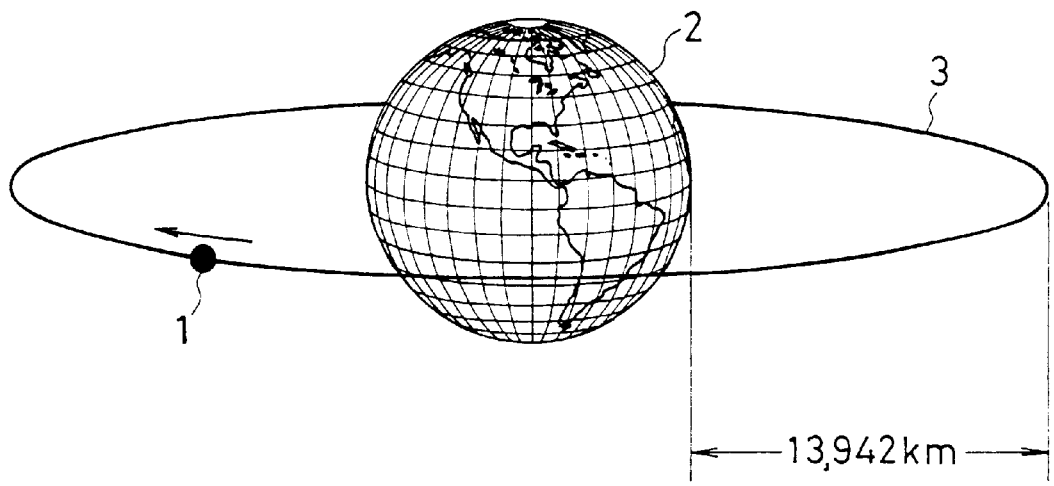
FIG. 2 is a conceptual diagram for explaining the westward equatorial satellite according to the present invention.
Figure 3:
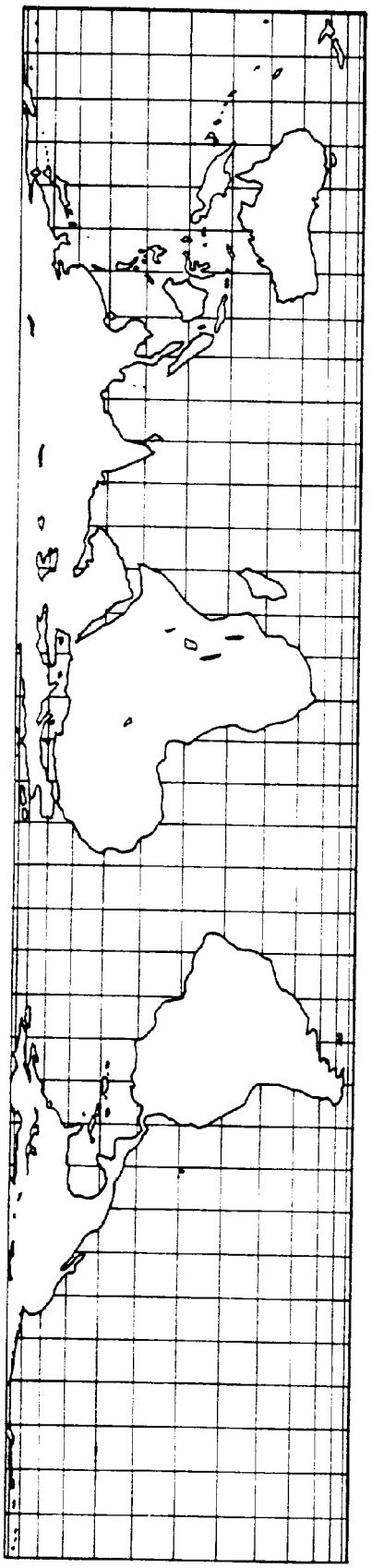
FIG. 3 shows the configuration of an image of the earth obtained by the westward equatorial satellite according to the present invention.
Figure 7:
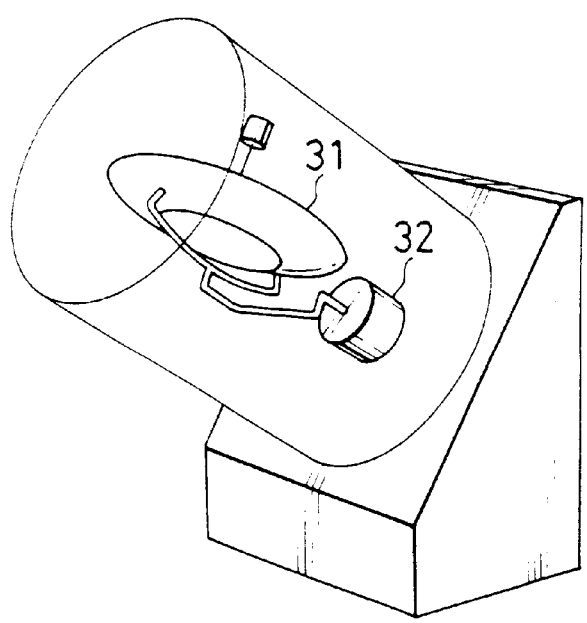
FIG. 7 shows an example of construction of the antenna system of a user's receiving station.

Since, in this manner, a large number of users are to directly receive data from the westward equatorial satellite, it is important that a simple user receiving station suffices. FIG. 7 shows an antenna apparatus of a user receiving station for this westward equatorial satellite. The satellite, ascending from east and descending to west, can be followed by rotating an antenna 31 fixed on a substantially north-oriented rotating shaft by means of a step motor 32 consisting of a single unit. This is possible only when the satellite is orbiting above the equator. The fact that a useful orbit must be in the equatorial plane can be seen from both the feasibility of using an antenna of such simple construction at a receiving station and the need for preventing a change in the configuration from one to another of the images as shown in FIG. 3.

A description will be given below by way of FIG. 8 with respect to an example of the construction of a radiometer for obtaining an image of the earth, which is to be mounted on the westward equatorial satellite having the above described construction. The scan in the north and south direction of the earth is performed such that an objective mirror 41 having an angle of incidence of 45 degrees is rotated at a fixed rate by means of a motor having its axis of rotation coinciding the axis of an optical-barrel 42. Denoted in FIG. 8 are: a radiator, 43; a west-side horizon mirror, 44; an east-side horizon mirror, 45; a base board, 46; and a blackbody, 47.

Figure 8:
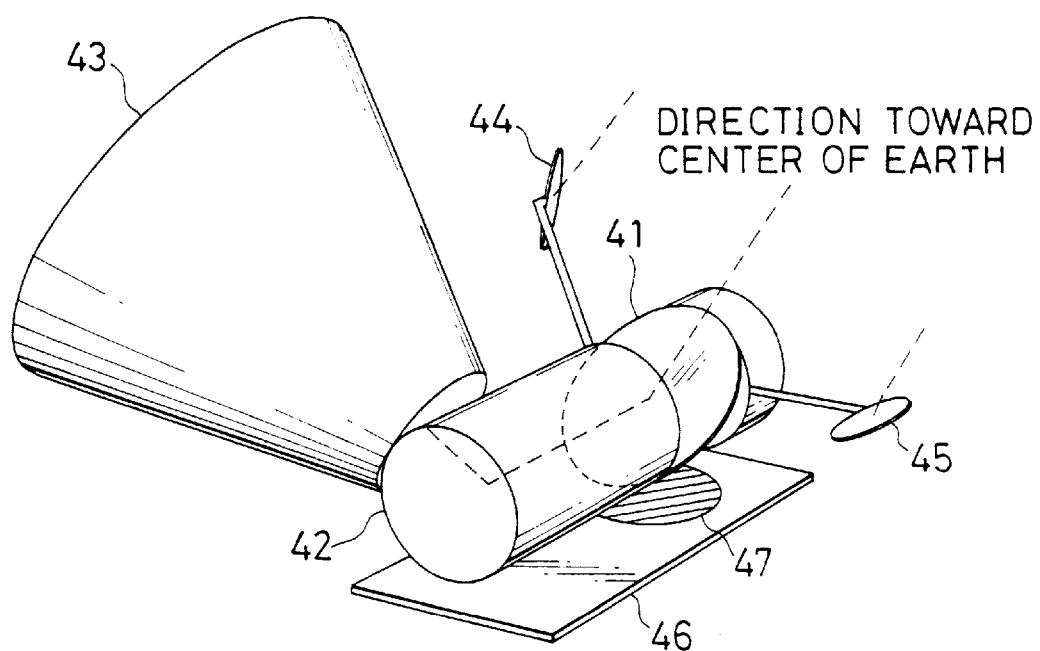
FIG. 8 shows an example of radiometer to be mounted on the westward equatorial satellite as shown in FIG. 6.
Figure 9A:
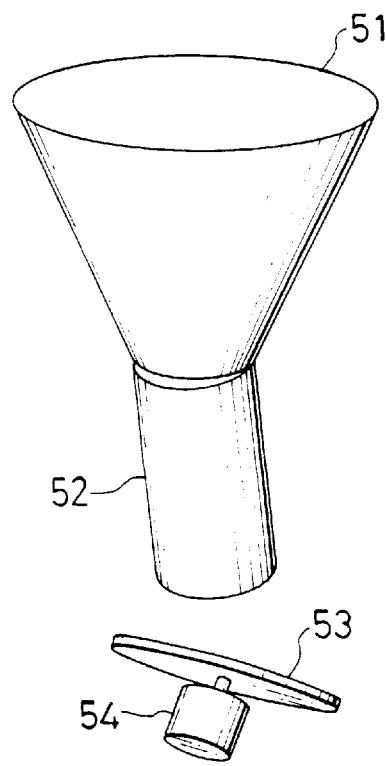
FIGS. 9A and 9B show the construction and locus of viewing direction of a small-size sub-radiometer for picking up images of 30 minutes before and after a normal point in time in the westward equatorial satellite according to the present invention.
Figure 9B:

While the radiometer shown in FIG. 8 is for scanning a meridian which contains the spot directly below the satellite or nadir, it is possible to additionally have a small-size sub-radiometer for scanning in an approximated manner along meridians which contain spots preceding and following the nadir in longitudes by 30 degrees. FIGS. 9A and 9B show the construction of such small-size sub-radiometer and locus on the earth to be scanned thereby. Denoted in FIG. 9A are: a radiator having an opening toward north, 51; an optical-barrel, 52; a scanning mirror, 53; and a motor, 54. The angle between the direction toward the center of the earth and the axis of the optical-barrel 52 is 101.3 degrees; the angle between the axis of the optical-barrel 52 and the rotating axis of the motor 54 is 129 degrees; and the angle between the rotating axis of the motor 54 and a perpendicular of the reverse side of the scanning mirror is 9.8 degrees. When the motor 54 is rotated, the viewing direction by way of the scanning mirror 53 describes a locus as indicated by the solid line in FIG. 9B, which intersects the longitudes indicated by the dotted line that are 30 degrees apart before and after from the longitude containing the nadir at latitudes of 50-degree N., 10-degree S. and 50-degree S., respectively. This locus is an adequate approximation of the meridians (longitudes) indicated by the dotted line between the latitudes of 50 degrees N. and 50 degrees S. Further, due to the fact that the locus is directed into the space at its southmost end, it is possible to provide a DC restore function which is necessary for a radiometer without a chopper. By disposing a sub-radiometer having the construction as described above, images of 30 minutes before and after the normal image can be obtained, which may be used in developing a method for timewise interpolation of images.

As has been described by way of the above embodiment, according to the invention, since a westward equatorial satellite is constructed by using an equatorial orbit toward west at an altitude of 13,942 km, a continuous image of the earth in a short time span can be readily obtained at every 6 hours by a single unit of satellite. Further, according to the invention, a westward equatorial satellite at an altitude of 13,942 km can be combined into a meteorological satellite system including a plurality of geostationary meteorological satellites to provide function as a common standby for the meteorological satellites and to eliminate the problem of the noncontinuousness between the adjoining geostationary meteorological satellites. In addition, there are such advantages as that it is possible to readily perform a reciprocity data calibration between the geostationary meteorological satellites.

What is claimed is:

1. A satellite orbiting toward west in the equatorial plane comprising an artificial satellite having an image pickup means mounted thereon for picking up an image of the earth and having a circular orbit toward west at an altitude of about 13,942 km above the equator of the earth.

2. A satellite orbiting toward west in the equatorial plane according to claim 1, further comprising a solar panel provided only on one side thereof and a magnetic torquer for offsetting solar wind torque caused by said solar panel.

3. A meteorological satellite system, including a satellite orbiting toward west in the equatorial plane having a circular orbit toward west at an altitude of about 13,942 km above the equator of the earth and incorporated into a meteorological satellite system employing a plurality of geostationary meteorological satellites to complement meteorological observation by the geostationary meteorological satellites.

4. A meteorological satellite system according to claim 3, comprising two units of said satellite orbiting toward west in the equatorial plane deployed at opposite positions from each other over the earth.

* * * * *